Aug. 25, 1925.

W. H. FOX

BALL

Filed Dec. 11, 1924

1,550,795

Inventor
William H. Fox
By his Attorneys
Merchant and Reeve

Patented Aug. 25, 1925.

1,550,795

UNITED STATES PATENT OFFICE.

WILLIAM H. FOX, OF MINNEAPOLIS, MINNESOTA, ASSIGNOR TO A. G. SPALDING & BROS., OF NEW YORK, N. Y., A CORPORATION OF NEW JERSEY.

BALL.

Original application filed June 16, 1922, Serial No. 568,791. Divided and this application filed December 11, 1924. Serial No. 755,191.

*To all whom it may concern:*

Be it known that I, WILLIAM H. FOX, a citizen of United States, residing at Minneapolis, in the county of Hennepin and State of Minnesota, have invented certain new and useful Improvements in Balls; and I do hereby declare the following to be a full, clear, and exact description of the invention, such as will enable others skilled in the art to which it appertains to make and use the same.

The present invention relates to improvements in balls such as base balls now used in the national game, and has for its primary object to provide a ball that will more readily absorb blows from a bat and better retain its true spherical form under hard usage. A weakness disclosed in the older form of cork center balls used at the present time is caused by imperfect centering of the cork core which, not being machine made, is slightly elliptical in shape and when placed between two semi-spherical rubber shells that are vulcanized together, air pockets are formed between core and shell, and which air pockets become enlarged when the ball is subject to hard usage. Again, the weakness mentioned discloses more rubber on one side of the core than on the other and this causes the ball to be erratic in bounding and less resilient or responsive to a hard blow than if the ball were perfectly true and concentric in respect to its core, its shell and general body. The main object, therefor, of this ball is to provide a ball that will be absolutely true at all times, from its core to cover, thereby insuring positive resilience as well as perfect and true bounding of the ball.

Said invention is a division of my copending application entitled "Balls," filed June 16, 1922 under serial number 568,791, and formally allowed June 19, 1924, patented Jan. 6, 1925, No. 1,521,808.

To the above end, generally stated, the invention consists of the novel construction and arrangement of parts, hereinafter described and defined in the claims.

In the accompanying drawings, which illustrate the invention, like characters indicate like parts throughout the several views.

Referring to the drawings.

Figure 2:
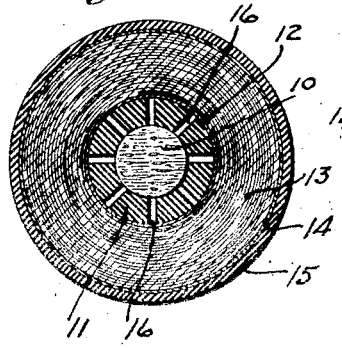
Fig. 2 is a view in section, taken on the line 2—2 of Fig. 1.
Figure 4:
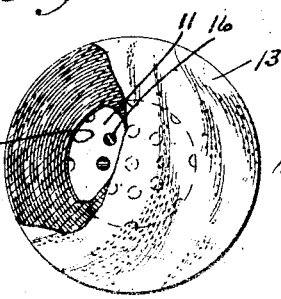
Fig. 4 is an elevation of the ball with the outer and inner covers removed, some parts being broken away and sectioned to expose the inner shell.

The improved ball comprises a central core 10, a shell 11, a casing 12, a body 13, an inner cover 14, and an outer cover 15. Said central core 10 is, as shown, in the form of a cork sphere encased in the shell 11, and which shell is preferably formed from two hemispheres formed in any suitable mold and connected by vulcanization after said core has been placed therein. The rubber shell 11, enveloping the core 10, has formed therein a multiplicity of radial holes which afford air cells 16. These air cells 16, as shown, are equi-distantly spaced in the walls of the shell 11, extend completely therethrough and have their inner ends closed by said core 10.

The casing 12 is of suitable material having an adhesive substance on each face thereof and which casing closes the outer ends of the air cells 16 in the shell 11 to which it is applied, and thus prevents the escape of air from said cells. The body 13 is formed by windings of threads of yarn or other suitable material, applied under adhesive tension, to the casing 12, and applied to its outer face is an inner cover 14. This inner cover 14 is formed from any suitable material, and applied to both of its faces is a substance of adhesive quality. One of the objects of the inner cover 14 is to cover up any irregularities or unevenness in the inner body structure, thereby insuring a smooth surface of the outer cover 15.

Figure 1:
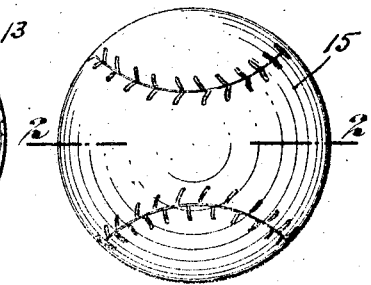
Fig. 1 is an elevation of the improved ball.
Figure 6:
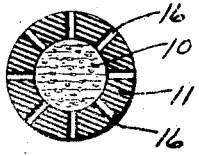
Fig. 6 is a view of the shell in section taken on the line 6—6 of Fig. 5.
Figure 7:
Figs. 7 and 8 are views in elevation showing the two sections of the shell before assembled.
Figure 3:
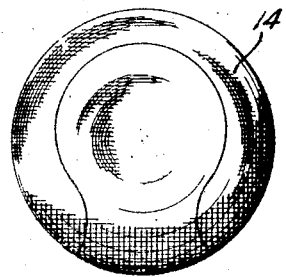
Fig. 3 is an elevation of the ball with the outer cover removed.
Figure 5:
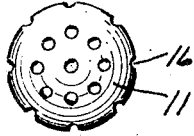
Fig. 5 is an elevation of the inner shell.
Figure 8:
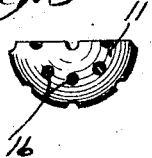
Figure 9:
Fig. 9 is an elevation of the central core for the shell.

The outer cover 15 may be formed from either leather or rubber, and when made from the former material is cut in two sections and said sections connected by stitches as indicated in Fig. 1. The inner cover 14 is also preferably formed in two sections cut as indicated in Fig. 3. When the outer cover 15 is made from rubber the complete ball, with the exception of said outer cover, is placed in a suitable mold and liquid gum poured therein and then vulcanized in the customary manner. During the vulcanization of the outer cover, said cover is simultaneously vulcanized to the inner cover. Preferably the interior of the mold is cut to represent stitches which are embossed on the finished ball, thereby giving the same the appearance and effect of a leather covered ball.

Obviously, the adhesive material on the casing 12 will securely attach the body 13 to the shell 11 and thereby prevent the two members from turning or sliding, the one in respect to the other. Likewise the adhesive material on the inner cover 14 will securely attach the outer cover 15 to the body 13 and prevent turning or sliding movement of said two members, the one in respect to the other, thus forming a compact, non-shifting body.

What I claim is:

1. A base ball comprising a spherical center of cork and an homogeneous enveloping layer or shell of vulcanized rubber having a plurality of air vents leading from the inner to the outer surface.

2. A base ball having a spherical center of cork, and an enveloping layer of vulcanized rubber, said enveloping layer having a plurality of passages leading from the surface of the cork to the outer periphery of the rubber shell.

3. As an article of manufacture, a core or center for use in making base balls, comprising a spherical cork center and a homogeneous shell of vulcanized rubber enveloping said cork center, and having air vents or passages therethrough.

In testimony whereof I affix my signature.

WILLIAM H. FOX.